Figure 1:
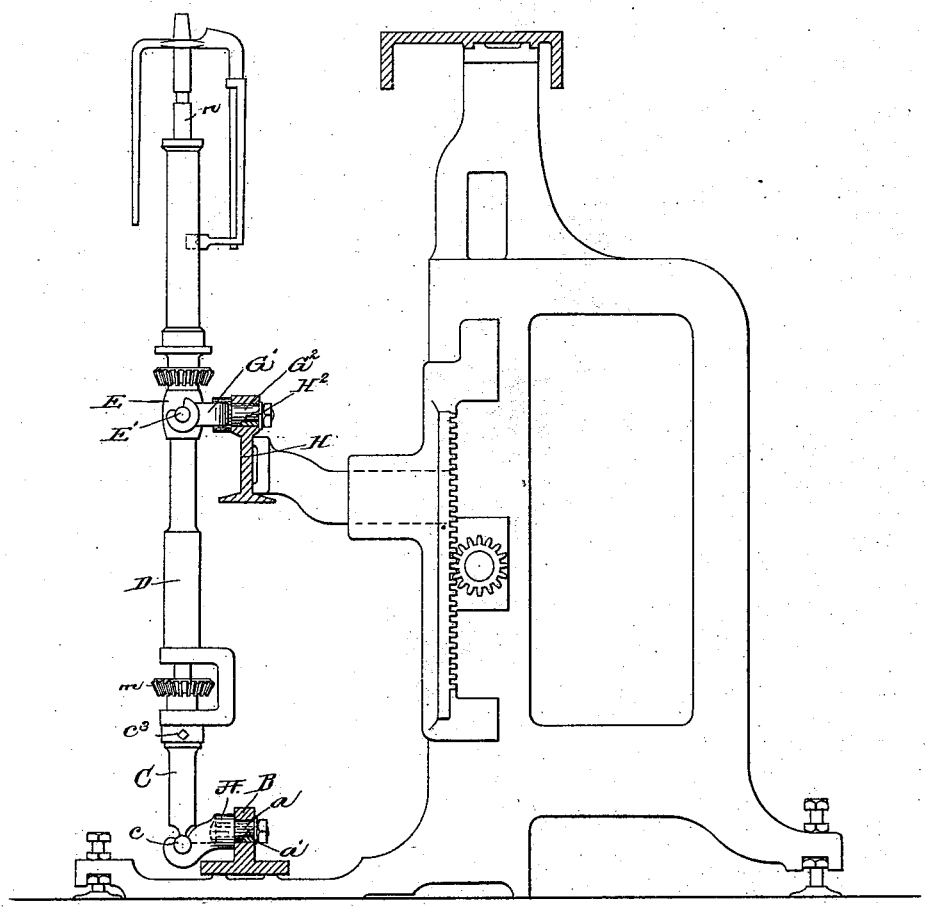

(No Model.) 2 Sheets—Sheet 1.

J. KERRIVAN.
SPINDLE TUBE BEARING FOR ROVING FRAMES.

No. 377,678. Patented Feb. 7, 1888.

Witnesses
Fred L. Emery.
John F. C. Prinkert

Inventor
John Kerrivan
by Crosby & Gregory
attys.

(No Model.) 2 Sheets—Sheet 2.
J. KERRIVAN.
SPINDLE TUBE BEARING FOR ROVING FRAMES.
No. 377,678. Patented Feb. 7, 1888.
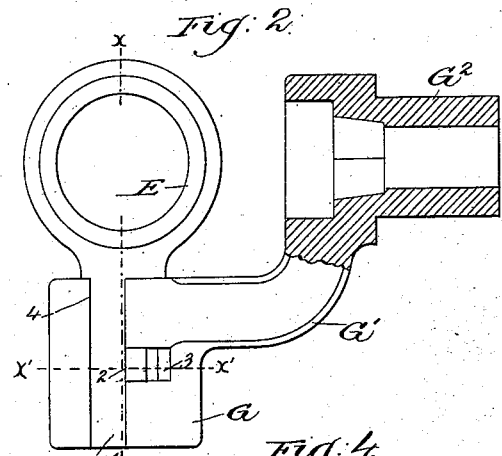
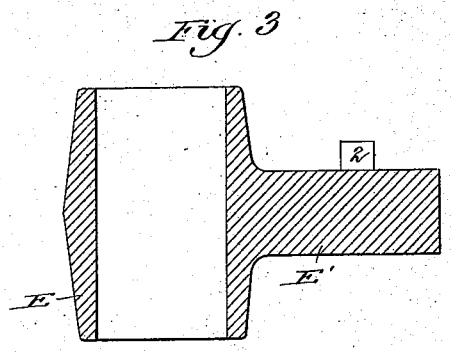
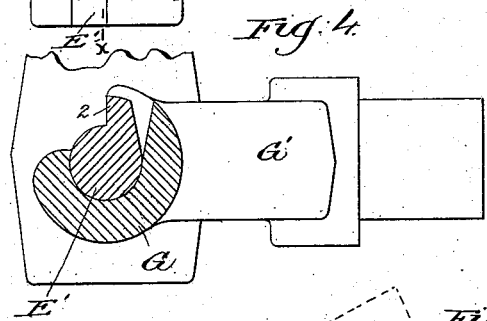
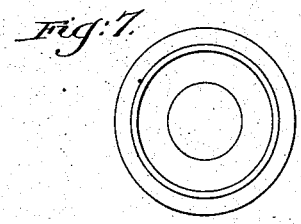
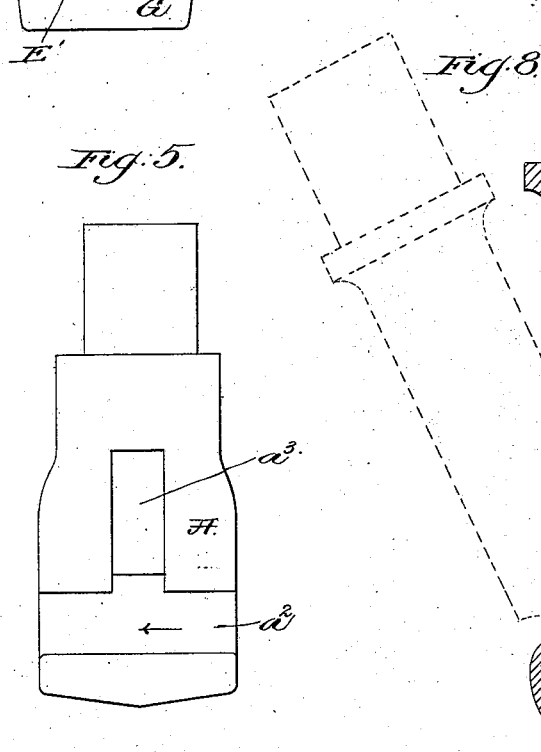
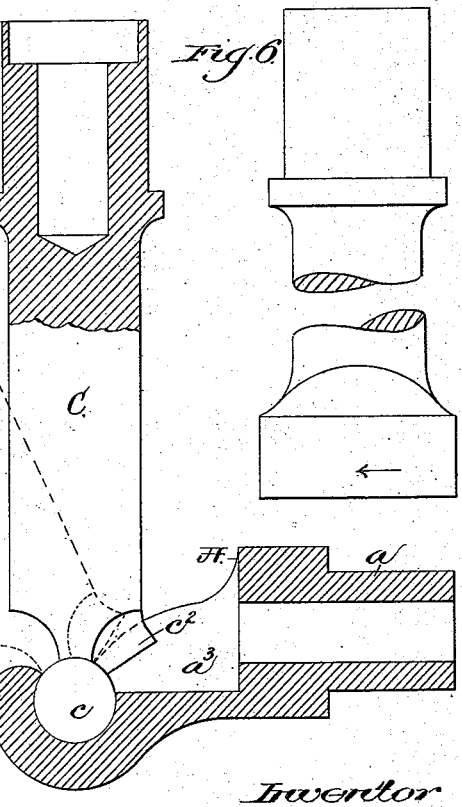
Witnesses
Fred L. Emery.
John F. C. Prindlett
Inventor
John Kerrivan
by Crosby & Gregory Attys

UNITED STATES PATENT OFFICE.

JOHN KERRIVAN, OF NEWTON UPPER FALLS, MASSACHUSETTS, ASSIGNOR TO THE PETTEE MACHINE WORKS, OF SAME PLACE.

SPINDLE-TUBE BEARING FOR ROVING-FRAMES.

SPECIFICATION forming part of Letters Patent No. 377,678, dated February 7, 1888.

Application filed January 31, 1887. Serial No. 226,043. (No model.)

*To all whom it may concern:*

Be it known that I, JOHN KERRIVAN, of Newton Upper Falls, county of Middlesex, and State of Massachusetts, have invented an Improvement in Spindle-Tube Bearings for Roving-Frames, of which the following description, in connection with the accompanying drawings, is a specification, like letters on the drawings representing like parts.

This invention has for its object to provide the usual tube of a roving-frame of the class shown in United States Patents Nos. 31,857 and 34,753, with a novel intermediate bearing and end support, whereby the cost of the machine may be reduced and its construction simplified. Herein the foot-step, secured to the lower end of the tube below the yoke embracing the spindle-gear, is provided with a nearly cylindrical foot having a locking projection which co-operates with a foot-step holder having a substantially semi-cylindrical recess to receive the said foot, and with a notch leading from the said recess to receive the said locking projection, such construction of the parts permitting the foot to be readily inserted into the foot-step holder when the tube is in an inclined position, the act of turning the tube into upright position locking the foot-step in the foot-step holder.

Prior to my invention, so far as I am aware, the foot-step of the tube, turned in a lathe and provided with a shoulder, has been fitted to a bored hole at the lower end of the yoke part of the tube, and the foot-step has been pivoted upon a bolt held by ears attached to the spindle-rail.

In this my invention the tube in which the spindle rotates has co-operating with it an improved intermediate bearing, which, properly secured to the copping-rail, is made to rise and fall in any usual manner with relation to the tube which it surrounds. This intermediate bearing is made as a sleeve having a shank provided with a lug, preferably somewhat tapering, to co-operate with a slotted hub carried by a bracket connected to the copping-rail, the bearing being free to adapt itself to the tube and thus avoid any cramping between the tube and bearing.

Figure 1 in elevation and partial section shows a sufficient portion of a roving frame or throstle of the kind referred to, to which my improvements have been added, to enable my invention to be understood. Fig. 2 is a top or plan view, on a larger scale, of the improved intermediate bearing, the bolt-receiving socket being in section; Fig. 3, a section in the line $x$, Fig. 2, of only the bolster-bearing and its shank; Fig. 4, a section of Fig. 2 in the line $x'$, part of the intermediate bearing being omitted; Fig. 5, a plan view of the foot-step holder; Fig. 6, a front elevation of the foot-step, broken out to shorten it on the drawings. Fig. 7 is a top view of Fig. 6, and Fig. 8 is a side elevation of the foot-step and foot-step holder put together, the upper part of the foot-step being broken out, the foot-step holder being in section longitudinally, the dotted lines showing the lower part of the foot-step and foot as being inserted into the foot-step holder, the full lines showing the foot-step locked in the foot-step holder in working position.

The foot-step holder A has a shank, $a$, which is turned to fit a hole in the spindle-rail B, of usual construction, the said holder being confined by a bolt, as $a'$. The outer end of the foot-step holder, shaped substantially as shown in Figs. 5 and 8, is provided with a substantially semicircular groove, $a^2$, which is intersected by a recess, as $a^3$, at right angles thereto.

The foot-step C at the lower end of the tube D is terminated by a nearly cylindrical foot, $c$, which enters the groove $a^2$, the foot having a locking projection, $c^2$, to enter the recess $a^3$ when the tube and its foot-step are in vertical position, as in Figs. 1 and 8, in which position the said parts are locked together.

To insert the foot $c$ of the step C into the foot-step holder A, the said step is tipped to the left, as shown by dotted lines, Fig. 8, and the foot-piece is moved into the groove $a^2$ in the direction of the arrows in Figs. 5 and 6, and when the projection $c^2$ arrives opposite the recess $a^3$ the foot-step is turned into upright position, (shown by full lines, Fig. 8,) the projection $c^2$ entering the recess $a^3$, and thereafter the tube D is connected to the said step by the set-screw $c^3$.

The tube D is surrounded by an intermediate bearing, E, it having a shank, E', provided with a lug, 2, the said lug, when placing the bearing in working position, first entering a longitudinal slot, 4, (see Fig. 2,) in the hub G; but when the bearing is turned into upright or working position to maintain the bolster and spindle $n$ in vertical position, as in Figs. 1, 2, and 4, the lug 2 is made to enter the slot 3, forming a bayonet-joint connection.

The hub G, slotted longitudinally from end to end, as shown in Fig. 2, and having a slot, 3, at right angles to it, is secured to the outer end of or forms part of an arm, G', having a socketed end, $G^2$, which enters a hole in the copping-rail H common to roving-frames, such as shown in the said patents, and is secured thereto by a bolt, as $H^2$, in usual manner.

The lug 2 and slot 3 constitute a sort of bayonet-joint connection between the intermediate bearing and the hub receiving the shank E', and enable the cost of the construction of the bearing and its supporting parts to be reduced over other previous methods of construction known to me; and so, also, by making the intermediate bearing, E, foot-step, foot, and foot-step holder as shown very much time is saved when assembling the parts or when taking them apart for repairs.

The bearing E may be readily removed from the hub when the tube is withdrawn from the said bearing by simply turning the shank to remove the lug 2 from the slot 3.

I claim—

1. The tube and the foot-step at its lower end, provided with the foot $c$, combined with the foot-step holder, having the groove $a^2$ to receive the said foot, substantially as described.

2. The tube and the foot-step at its lower end, provided with a nearly cylindrical foot and a projection, $c^2$, combined with the foot-step holder having the substantially semi-cylindrical groove and recess $a^3$, to operate all substantially as described.

3. The tube, the foot-step at its lower end having a foot, and a foot-step holder for it and the intermediate bearing having a shank provided with a lug, 2, combined with the arm G', and the hub G, having a longitudinal slot and a second slot intersecting it, all substantially as described.

4. The foot-step holder provided with the substantially semicircular groove $a^2$ and recess $a^3$, the tube, its attached foot-step, having the foot $c$ and projection $c^2$, and the arm G', having the hub G slotted longitudinally, and also provided with a slot, as 3, combined with the intermediate bearing, E, having a shank provided with a lug, 2, to enter the said slot 3, all substantially as described.

In testimony whereof I have signed my name to this specification in the presence of two subscribing witnesses.

JOHN KERRIVAN.

Witnesses:
G. TAPPAN FRANCIS,
FRANK J. HALE.